United States Patent
Dubois et al.

(10) Patent No.: US 8,404,140 B2
(45) Date of Patent: Mar. 26, 2013

(54) CONDUCTING FLUID CONTAINING MILLIMETRIC MAGNETIC PARTICLES

(75) Inventors: Emmanuelle Dubois, Paris (FR); Jean Chevalet, Ivry sur Seine (FR)

(73) Assignees: Universite Pierre et Marie Curie, Paris (FR); Centre National de la Recherche Scientifique, Paris (FR)

( * ) Notice: Subject to any disclaimer, the term of this patent is extended or adjusted under 35 U.S.C. 154(b) by 954 days.

(21) Appl. No.: 11/922,726

(22) PCT Filed: Jun. 26, 2006

(86) PCT No.: PCT/FR2006/001469
§ 371 (c)(1),
(2), (4) Date: Jan. 16, 2009

(87) PCT Pub. No.: WO2007/000509
PCT Pub. Date: Jan. 4, 2007

(65) Prior Publication Data
US 2009/0173907 A1    Jul. 9, 2009

(30) Foreign Application Priority Data

Jun. 27, 2005   (FR) ..................................... 05 06509

(51) Int. Cl.
*H01F 1/44* (2006.01)
*C09K 5/12* (2006.01)
*G21C 15/28* (2006.01)

(52) U.S. Cl. .............. 252/62.55; 420/526; 252/62.51 R; 252/62.52

(58) Field of Classification Search .................. 420/526; 252/62.52, 62.55, 62.51 R
See application file for complete search history.

(56) References Cited

U.S. PATENT DOCUMENTS

| | | | |
|---|---|---|---|
| 3,449,208 A | 6/1969 | Balent et al. | |
| 3,726,642 A | 4/1973 | Isaacs et al. | |
| 3,998,669 A * | 12/1976 | Strnat | 428/558 |
| 4,315,827 A * | 2/1982 | Bottenberg et al. | 252/62.51 R |
| 4,580,619 A | 4/1986 | Aitken | |
| 5,382,373 A * | 1/1995 | Carlson et al. | 252/62.55 |
| 7,373,463 B2 * | 5/2008 | Teglia et al. | 711/154 |
| 7,393,463 B2 * | 7/2008 | Ulicny et al. | 252/62.52 |

FOREIGN PATENT DOCUMENTS

| | | |
|---|---|---|
| DE | 100 65 671 A1 | 7/2002 |
| EP | 1 506 987 A1 | 2/2005 |
| FR | 2 863 042 A1 | 6/2005 |

OTHER PUBLICATIONS

Rosensweig, R. E., "Theory for Stabilization of magnetic colloid in liquid metal", Journal of Magnetism and Magnetic Materials, 1999, pp. 1-6, Elsevier Science B.V., XP-004181182.
International Search Report dated Apr. 10, 2007 including English translation of the relevant portion (Five (5) pages).

* cited by examiner

*Primary Examiner* — Carol M Koslow
(74) *Attorney, Agent, or Firm* — Merchant & Gould

(57) ABSTRACT

The invention relates to a composite material formed by millimeter-scale particles of magnetic material A and a conductive liquid B. The material is characterized in that the material A is chosen from magnetic compounds and magnetic alloys and is in the form of particles, the mean size of which is between 0.1 and 2 mm, and in that the support fluid B is a conductive fluid chosen from metals, metal alloys and salts that are liquid at temperatures below the Curie temperature of the material A, or from mixtures thereof.

28 Claims, No Drawings

CONDUCTING FLUID CONTAINING MILLIMETRIC MAGNETIC PARTICLES

The present invention relates to a composite material formed by particles of magnetic material and a conductive liquid.

BACKGROUND OF THE INVENTION

It is known to use heat-transfer fluids in refrigeration or heating systems, in particular in heat exchangers in industrial plants, such as those of nuclear power stations or solar energy converters.

Heat-transfer fluids generally consist of liquid chemical compounds or mixtures of these compounds, such as ethylene glycol, propylene glycol, petroleum-based oils, or silicones. Mention may also be made of mixtures of heavy polyaromatic compounds, aryl ethers, and terphenyls, which are particularly resistant to high temperatures and allow operation up to about 300° C. It is also known to use certain organic molten salts containing particulate additives as heat-transfer fluid. Such materials can be used over a wide temperature range, and the purpose of the particulate additives is to improve the thermal conductivity. The fluids are generally made to circulate by mechanical systems, comprising moving parts, especially blades and pumps. These mechanical systems undergo wear owing in particular to the friction caused by the passage of the heat-transfer fluid. Furthermore, when they are used at temperatures above about 350° C., these fluids undergo extensive rapid degradation and cause vapor pressure problems. Their use in the field of high-power high-temperature heat exchangers for example is therefore excluded.

SUMMARY OF THE INVENTION

The object of the present invention is to provide a material capable of serving as a heat-transfer fluid that overcomes the drawbacks of the systems of the prior art, namely the wear of mechanical parts, and that increases the maximum use temperature.

This is why the subject of the present invention is a composite material, a method of producing it, and its applications.

DETAILED DESCRIPTION OF THE PREFERRED EMBODIMENTS

The composite material according to the present invention is formed by a support fluid B and particles of magnetic material A. Said composite is characterized in that:

the material A is chosen from magnetic compounds and magnetic alloys and is in the form of particles, the mean diameter of which is between 0.1 and 2 mm; and the support fluid B is a conductive fluid chosen from metals, metal alloys and salts that are liquids at temperatures below the Curie temperature of the material A, or from mixtures thereof.

A material according to the invention has a high electrical conductivity and a high thermal conductivity, and, although heterogeneous, it may remain stable owing to the good wetting of A by B when the densities are close.

The magnetic material A may be chosen from magnetic metals and metal oxides, magnetic alloys and magnetic components. Among metals and metal oxides, mention may be made of iron, iron oxide, cobalt and nickel. Among alloys, mention may be made of steel and alloys having a high magnetic permeability. An alloy having a high magnetic permeability is an alloy having an initial permeability of greater than 1000. Such alloys are described in particular in Chapter 2 of the work "Alliages magnétiques et ferrites", [*Magnetic alloys and ferrites*] by M. G. Say, published by Dunod, Paris, 1956. As examples of high-permeability alloys, mention may in particular be made of iron-silicon alloys and alloys consisting essentially of Ni and Fe, sold under the name Mumetal® or Permalloy®. Amorphous magnetic alloys may also be mentioned, such as for example alloys of Fe, Co and Ni containing about 20% B, C, Si or P, and nanocrystalline magnetic alloys, such as for example Fe/Cu/Nb/Si/B alloys and Fe/Zr/B/Cu alloys.

The material A may consist of substantially spherical particles having a mean diameter between 0.1 and 2 mm. The material A may also be in the form of two batches: a first batch formed from substantially spherical particles having a mean size between 0.1 and 2 mm; a second batch formed from micron-scale particles, the size distribution of which is homogeneous, for example between 1 nm and 50 µm. The particles of magnetic material may furthermore consist of a batch of a first magnetic material A and a batch of a second magnetic material A' chosen from the group defined for A.

The term "electrically conductive fluid" is understood to mean a fluid that has an electrical resistivity of less than about 1000 ohms per centimeter within the temperature range in which the electrolysis takes place.

When the electrically conductive fluid B is a metal, it may be chosen from metals that are liquids by themselves or in the form of mixtures of several of them at temperatures below the Curie point of the magnetic material A with which they are associated. As examples, mention may be made of Hg, Ga, In, Sn, As, Sb, alkali metals and mixtures thereof.

When the electrically conductive fluid B is a molten metal alloy, it may be especially chosen from In/Ga/As alloys, Ga/Sn/Zn alloys, In/Bi alloys, Wood's alloy, Newton's alloy, Arcet's alloy, Lichtenberg's alloy and Rose's alloy. Some of these alloys are commercially available. The composition and the melting point of some of them are given below:

| Composition (% by weight) | $T_m$ (° C.) |
|---|---|
| 21.5In—62.5Ga—16.0Sn | 10.7 |
| 17.6In—69.8Ga—12.5Sn | 10.8 |
| 82.0Ga—12.0Sn—6.0Zn | 17 |
| 67In—33Bi | 70 |
| Wood's alloy: 50Bi—25Pb—12.5Sn—12.5Cd | 70 |
| Newton's alloy: 50Bi—31.2Pb—18.8Sn | 97 |
| Arcet's alloy: 50 Bi, 25Sn—25Pb | 98 |
| Lichtenberg's alloy: 50Bi—20Sn—30Pb | 100 |
| Rose's alloy: 50Bi—22Sn—28Pb | 109 |

As examples of salts that may constitute the conductive fluid B mention may be made of:

alkylammonium nitrates in which the alkyl group comprises from 1 to 18 carbon atoms, guanidinium nitrates, imidazolium nitrates and imidazolinium nitrates;

alkali metal chloroaluminates, which are liquids at temperatures above 150° C.; and salts comprising a $BF_4^-$, $PF_6^-$ or trifluoroacetate anion and a cation chosen from amidinium $[RC(=NR_2)—NR_2]^+$, guanidinium $[R_2N—C(=NR_2)—NR_2]^+$, pyridinium

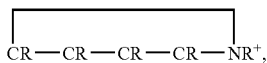

imidazolium

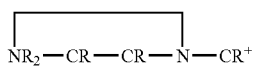

imidazolinium

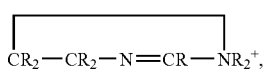

and triazolium

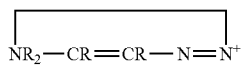

ions, in which each substituent R represents, independently of the others, H or an alkyl radical having from 1 to 8 carbon atoms, said salts having conductivities of up to 10 mS/cm and being very stable. As an example, mention may be made of 1-ethyl-3-methylimidazolium bis(trifluoromethylsulfonyl) imide.

Among composite materials according to the invention, mention may in particular be made of the materials consisting of the following elements: steel balls/Hg, steel balls/Ga, steel balls+Fe powder/Hg, steel balls+Fe powder/Ga.

Another subject of the present invention is a method for producing the composite material. Said method consists in introducing non-ionic magnetic particles, which become magnetic material A into an electrically conductive fluid B, which method is implemented electrochemically in an electrochemical cell in which:

the electrolyte consists of an ionically conductive medium containing the non-ionic magnetic particles that become magnetic material A, the mean diameter of which is between 1 and 10 μm;

the particles that become material A are nonionic in conductive fluid B;

the cathode consists of a film of the conductive fluid B connected to a potential source capable of delivering a current density between 100 mA/cm$^2$ and 3 A/cm$^2$;

the anode consists of a material that is nonoxidizable under the conditions of the method, for example platinum or vitreous carbon; and the cathode is subjected to a negative potential difference relative to the anode.

This configuration of an electrochemical cell is commonly referred to as a "mercury pool electrode".

The electrolysis may either be current-controlled, by controlling the variation in potential at the cathode, or potential-controlled, by controlling the potential relative to a reference electrode (using a control device of the potentiostat type). The potential applied to the cathode must in all cases be the most negative possible in order to reduce the interfacial tension between the materials A and B, but it must be limited so as not to induce other electrochemical reactions such as the excessive evolution of hydrogen or the formation of amalgams, detrimental to the efficiency and to the stability of the product.

The anode may be placed in a compartment separated from the cathode by a porous wall. The cell furthermore includes a reference electrode when the electrolysis is potential-controlled.

The nonionic particles that become magnetic material A may be chosen from metals and metal oxides, and also from the abovementioned alloys.

The particles are introduced into the ionically conductive medium forming the electrolyte, said particles preferably being substantially spherical. In one particular embodiment, the particles are in the form of balls having a heterogeneous size distribution. In another embodiment, the particles that become magnetic material A are introduced in the form of two batches: a first batch formed from substantially spherical particles having a mean size between 0.1 and 2 mm; a second batch formed from micron-scale particles, the size distribution of which is homogeneous, for example between 1 nm and 50 μm. The particles may furthermore be formed by a batch of a particles that become a first magnetic material A and by a batch of particles that become second magnetic material A' chosen from the group defined for A.

The respective amounts of particles that become material A and of conductive fluid B are such that the final particle concentration of magnetic material in the conductive fluid B remains below the value above which the dispersion is no longer homogeneous or becomes pasty, which would result in precipitation, taking into account the degree of solubility of A in B. The determination of this value lies within the competence of a person skilled in the art.

The particles may be used as defined above but they may also be used after they have been coated with a metal having an affinity for A in the conductive fluid B.

The conductive fluid B used for preparing the composite material according to the invention is chosen from the conductive fluids defined above for the material itself.

When the electrically conductive fluid B consists of a given metal, one or more elements may be added to it which may form a stable liquid phase (or a liquid amalgam when said metal is mercury) and which stabilize the dispersion of the particles A within the conductive fluid, preventing them from aggregating. For example, if B is mercury, Sn, Ag, Cu, Cd, Zn, Tl, Pb, In, As or Sb may be added to it in a proportion that remains less than the value that would lead to the formation of a solid phase.

The presence of impurities is liable to significantly modify the interfacial properties between the magnetic material A and the conductive fluid B, and consequently the wettability of the material A by the conductive fluid B. If by implementing the method of the invention for a given pair A/B a suitable result is not obtained, it is recommended to check the nature and the level of impurities.

The method of the present invention may be implemented in particular for preparing a composite material having magnetic properties and electrical and thermal conduction properties from the non-ionic particles and the electrically conductive fluids mentioned above. It is particularly useful for preparing a composite material in which the material constituting the magnetic particles A and the material constituting the electrically conductive fluid B exhibit little or no mutual affinity, and when the magnetic material is at best only weakly wettable by the electrically conductive fluid. As examples of such materials, mention may be made of the conductive composite materials containing the following elements:

| | |
|---|---|
| Fe and/or steel particles in | Hg |
| Fe and/or steel particles in | Ga |
| Co or Ni particles in | Hg |
| Fe particles in | Ga + Sn |
| Fe particles in | Wood's alloy |
| Mu-metal ® particles in | Wood's alloy. |

The particles that become magnetic material A may be introduced into the ionically conductive medium and then into the electrically conductive liquid B during the electrolysis, that is to say gradually until the desired concentration in B is obtained. In this case, the current density and/or the potential are modified at the same time as the particles that become magnetic material A are introduced, thereby making it possible, as the case may be, to introduce particles of A' that are different from the particles of A.

The ionically conductive medium is preferably a nonoxidizing medium. It may be formed by a solution of a nonoxidizing acid (for example HCl) or of a strong base in a solvent. The solvent may be water, a polar organic liquid or a molten salt. The polar organic liquid may be chosen from acetonitrile, acetone, dimethylformamide (DMF), dimethylsulfoxide (DMSO), propylene carbonate (PC), dimethyl carbonate and N-methylpyrrolidone. The molten salt may be chosen from those defined above as electrically conductive fluid.

The potential source to which the cathode is connected must be capable of delivering a current density of at least around 100 mA/cm$^2$ of cathode.

When the electrochemical cell is potential-controlled, it necessarily includes a reference electrode, and the potential differential difference between the cathode and said reference electrode is fixed within a range such that the interfacial tension between A and B is reduced so as to allow wetting of the particles A by the liquid B. For example, when the particles A are Fe particles and the liquid B is Hg, the voltage is between −1 V and −3 V relative to the reference electrode.

When the electrochemical cell operates in galvanostatic mode, that is to say when it is current-controlled, and when it includes a reference electrode, it is necessary to impose action thresholds that reduce the current so that the potential difference between the cathode and the reference electrode is limited to the range defined in the case in which the cell is potential-controlled.

When the electrochemical cell is current-controlled without a control device and when it does not include a reference electrode, it is necessary to monitor the total potential relative to a predetermined limit, for example using a temporary reference electrode.

In practice, when operating in current-controlled mode, it is preferable to use an electrochemical cell that includes a reference electrode.

In a particularly preferred way of implementing the electrochemical preparation, a magnetic field is applied perpendicular to the plane of the cathode. In another method of implementation, other types of action on the material may be obtained by superposing pulses or AC components on the current or potential controlling the process, in the absence or in the presence of said perpendicular magnetic field.

At the end of the operation, the conductive fluid constituting the cathode is highly enriched with magnetic particles A and constitutes the electrically conductive composite material of the invention.

A third subject of the invention is the use of the composite material as heat-transfer fluid. The presence of magnetic particles allows the material to move inside tubes in which it is supposed to circulate by a simple induction effect, thereby obviating the need for mechanical parts subject to wear. Furthermore the metallic nature of this of this electrically conductive support fluid and its higher thermal conduction than that of the usual fluids (even when doped with metal particles) promote heat transfer.

The present invention is illustrated below by a few specific exemplary embodiments to which however the invention is not limited.

The following starting products were used in the examples:
Mercury
Gallium
100C6 steel balls (made of iron with 1% carbon and 1% chromium) with a diameter of 1.5 mm
Powdered iron, sold under the reference 312-31 (reduced iron for analysis) by Riedel-de Haën, consisting of spherical particles having a diameter of about 10 μm
Mu-Metal®.

The materials were prepared in an electrochemical cell which was connected to a potential source and provided with stirring means, and in which the cathode was formed by a layer of the electrically conductive fluid B, a platinum electrode provided the contact with the cathode, a second platinum electrode operated as anode, and a calomel electrode operated as reference electrode.

Example 1

Iron/Steel/Hg Composite Material

Preparation of the Material:
8.694 g of mercury (material B) were placed in the bottom of the cell, 10 ml of 0.1M HCl were added and the mixture was heated to 50° C. The potential source generated a potential difference of 6 V between the two platinum electrodes, inducing a current of around 250 mA. Next, 0.2 g of steel balls and 0.54 g of powdered iron were added. The layer of mercury was subjected to slight stirring to make it easier to incorporate the magnetic materials in the mercury layer and to prevent coarsening of the hydrogen bubbles at the surface of the mercury.
Characterization of the Material Obtained:
The volume fraction of iron in the material obtained was 0.127.
The measured saturation magnetization of this material was 250 kA/m.
The initial susceptibility at low magnetic field was 1.45.

Example 2

Iron/Steel/Ga Composite Material

Preparation of the Material:
4.86 g of gallium (material B) were placed in the bottom of the cell and 10 ml of 0.2M HCl were added. The mixture was heated to a temperature of 50° C. and then a potential difference of 11 V was applied between the two platinum electrodes. Next, 0.2 g of steel balls and 0.142 g of iron powder were added. A magnet was then used to bring the iron beneath the gallium, which was subjected to slight stirring using the magnet.
Characterization of the Material Obtained:
The volume fraction of iron in the material obtained was 0.04.
The measured saturation magnetization of this material was 72 kA/m.
The initial susceptibility at low magnetic field was 0.42.

Example 3

Mu-Metal/Wood's Alloy Composite Material

Preparation of the Material:
6.1 g of Wood's alloy (material B) were placed in the bottom of the cell and 10 ml of 0.1M HCl were added. The mixture was heated to a temperature of 75° C. and then a potential difference of 6 V was applied between the two platinum electrodes. Next, 0.32 g of Mu-metal in the form of platelets measuring 1 mm×1 mm×0.05 mm were added in 3 fractions, the additions being spaced apart by 5 minutes. After each addition, the potential difference between the two electrodes was raised to 12 V for 30 s.

Characterization of the Material Obtained:

The volume fraction of magnetic material in the material obtained was around 0.08.

The saturation magnetization of the material was 110 kA/m.

The initial susceptibility at low magnetic field was 3.5.

The invention claimed is:

1. A composite material comprising a magnetic material A and a liquid support B, wherein:
   the material A is selected from the group consisting of magnetic compounds and magnetic alloys and is in the form of particles, the mean diameter of which is between 0.1 and 2 mm; and
   the support fluid B is a conductive fluid selected from the group consisting of metals, metal alloys salts that are liquids at temperatures below the Curie temperature of the material A, and from mixtures thereof.

2. The composite material as claimed in claim 1, wherein the electrically conductive fluid B is a metal that is a liquid by itself or is a mixture of several metals that are liquids at temperatures below the Curie point of the magnetic material A with which they are associated.

3. The composite material as claimed in claim 2, wherein the electrically conductive fluid B is selected from the group consisting of Hg, Ga, In, Sn, As, Sb, alkali metals, and mixtures thereof.

4. The composite material as claimed in claim 1, wherein the electrically conductive fluid B is a molten metal alloy selected from the group consisting of In/Ga/As alloys, Ga/Sn/Zn alloys, In/Bi alloys, Wood's alloy, Newton's alloy, Arcet's alloy, Lichtenberg's alloy and Rose's alloy.

5. The composite material as claimed in claim 1, wherein the electrically conductive fluid B is a salt selected from the group consisting of:
   alkylammonium nitrates in which the alkyl group comprises from 1 to 18 carbon atoms, guanidinium nitrates, imidazolium nitrates and imidazolinium nitrates;
   alkali metal chloroaluminates, which are liquids at temperatures above 150° C.; and
   salts comprising a $BF_4^-$, $PF_6^-$ or trifluoroacetate anion and a cation chosen from amidinium $[RC(=NR_2)-NR_2]^+$, guanidinium $[R_2N-C(=NR_2)-NR_2]^+$, pyridinium

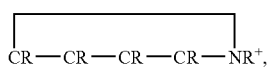

imidazolium

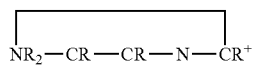

imidazolinium

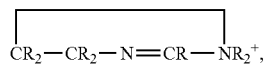

and triazolium

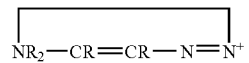

ions, in which each substituent R represents, independently of the others, H or an alkyl radical having from 1 to 8 carbon atoms.

6. The composite material as claimed in claim 1, wherein the magnetic material A is selected from the group consisting of magnetic metals, metal oxides, magnetic alloys and magnetic compounds.

7. The composite material as claimed in claim 6, wherein the magnetic material A is selected from the group consisting of iron, iron oxide, cobalt, nickel, steel and iron/silicon alloys.

8. The composite material as claimed in claim 1, wherein the amount of magnetic particles is at most equal to the threshold value above which the dispersion is no longer homogeneous or solids precipitate.

9. The composite material as claimed in claim 1, wherein the material A comprises substantially spherical particles.

10. The composite material as claimed in claim 1, which comprises substantially spherical particles of magnetic material having a means size between 0.1 and 2 mm and particles of magnetic material the size distribution of which is homogeneous, between 1 nm and 50 μm.

11. The composite material as claimed in claim 1, wherein the magnetic material particles may be formed by a batch of a first magnetic material A and by a batch of a second magnetic material A' chosen from the group defined for A.

12. The material as claimed in claim 1, comprising a magnetic material/electrically conductive fluid B pair selected from the group consisting of Fe/Hg, steel/Hg, Co/Hg, Ni/Hg, Fe/Ga, steel/Ga, Fe/Ga+Sn, and Fe/Wood's alloy.

13. A method for the preparation of a conductive composite material comprising a magnetic material A and an electrically conductive fluid B comprising the steps of:
   introducing non-ionic magnetic particles, which become magnetic material A, into an electrically conductive fluid B, and
   applying a current in the range of 0.1 to 3 A/cm$^2$;
   wherein the method is implemented electrochemically in an electrochemical cell in which:
      the electrolyte comprises an ionically conductive medium containing the non-ionic particles, the mean diameter of which is between 0.1 and 2 mm;
      the cathode consists of a film of the conductive fluid B connected to a potential source capable of delivering a current density between 0.1 and 3 A/cm$^2$;
      the anode consists of a material that is nonoxidizable under the conditions of the method; and
      the cathode is subjected to a negative potential difference relative to the anode.

14. The method as claimed in claim 13, wherein the non-ionic particles are selected from the group consisting of magnetic metals, metal oxides, magnetic alloys and magnetic compounds.

15. The method as claimed in claim 14, wherein the non-ionic particles are selected from the group consisting of iron, iron oxide, cobalt, nickel, steel and Fe—Si alloys.

16. The method as claimed in claim 13, wherein the non-ionic particles are substantially spherical.

17. The method as claimed in claim 13, wherein the non-ionic particles are in the form of a first batch formed from substantially spherical particles having a mean size of between 0.1 and 2 mm and of a second batch formed from micron-scale particles, the size distribution of which is homogeneous, between 1 nm and 50 µm.

18. The method as claimed in claim 13, wherein the non-ionic particles are a mixture of particles selected from the group iron, iron oxide, cobalt, nickel, steel and Fe—Si alloys.

19. The method as claimed in claim 13, wherein the respective amounts of the non-ionic particles, which become magnetic material A, and of conductive fluid B are such that the final concentration of particles of magnetic material A in the conductive fluid B remains less than the value above which the dispersion is no longer homogeneous or solids precipitate, taking into account the degree of solubility of the magnetic material A in the fluid B.

20. The method as claimed in claim 13, wherein the electrically conductive fluid B is selected from the group consisting of metals, metal alloys and salts that are liquids at temperatures below the Curie temperature of the material A, and mixtures thereof.

21. The method as claimed in claim 20, wherein the electrically conductive fluid B is a metal that is a liquid by itself or is a mixture of several metals that are liquids at temperatures below the Curie point of the magnetic material A with which they are associated.

22. The method as claimed in claim 21, wherein the electrically conductive fluid B is selected from the group consisting of Hg, Ga, In, Sn, As, Sb, alkali metals, and mixtures thereof.

23. The method as claimed in claim 20, wherein the electrically conductive fluid B is a molten metal alloy selected from the group consisting of In/Ga/As alloys, Ga/Sn/Zn alloys, In/Bi alloys, Wood's alloy, Newton's alloy, Arcet's alloy, Lichtenberg's alloy and Rose's alloy.

24. The method as claimed in claim 20, wherein the electrically conductive fluid B is a salt selected from the group consisting of:
   alkylammonium nitrates in which the alkyl group comprises from 1 to 18 carbon atoms, guanidinium nitrates, imidazolium nitrates and imidazolinium nitrates;
   alkali metal chloroaluminates, which are liquids at temperatures above 150° C.; and
   salts comprising a $BF_4^-$, $PF_6^-$ or trifluoroacetate anion and a cation chosen from amidinium $[RC(=NR_2)-NR_2]^+$, guanidinium $[R_2N-C(=NR_2)-NR_2]^+$, pyridinium

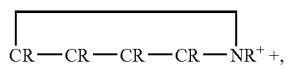

imidazolium

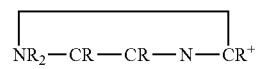

imidazolinium

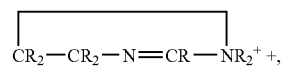

and triazolium

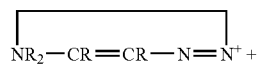

ions, in which each substituent R represents, independently of the others, H or an alkyl radical having from 1 to 8 carbon atoms.

25. The method as claimed in claim 21, wherein one or more elements are added to the metal forming the electrically conductive fluid B, which elements may form a stable liquid phase or a liquid amalgam when said metal is mercury.

26. The method as claimed in claim 13, wherein the ionically conductive medium is formed by a solution of a non-oxidizing acid or of a strong base in a solvent.

27. The method as claimed in claim 26, wherein the solvent is selected from the group consisting of water, polar organic liquids and molten salts.

28. The method as claimed in claim 13, further comprising applying a magnetic field and the current to form magnetic material A in the electrically conductive fluid B.

* * * * *